G. A. LOWRY.
SHREDDING MACHINE.
APPLICATION FILED MAY 6, 1912.
1,063,365.
Patented June 3, 1913.
4 SHEETS—SHEET 1.
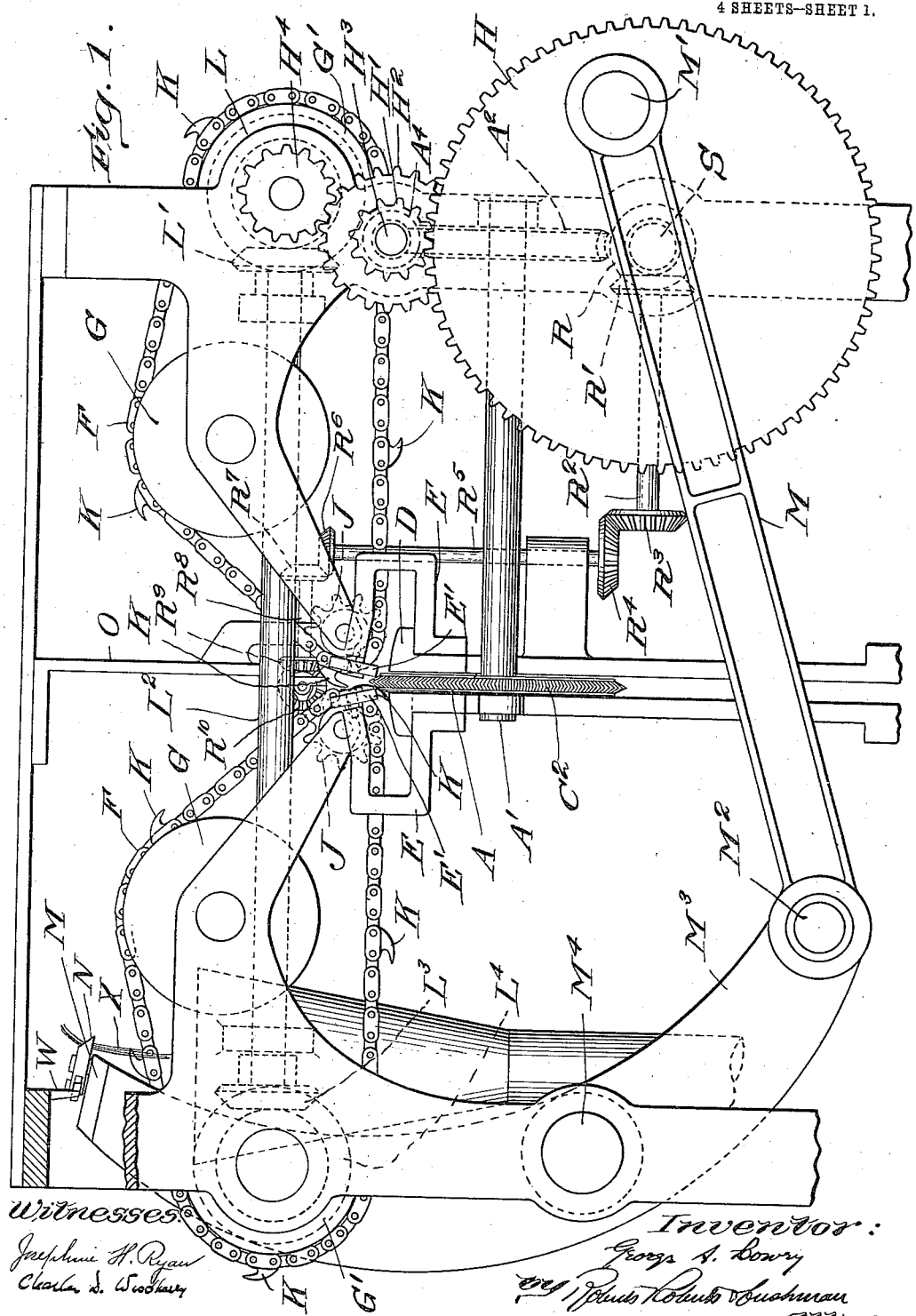

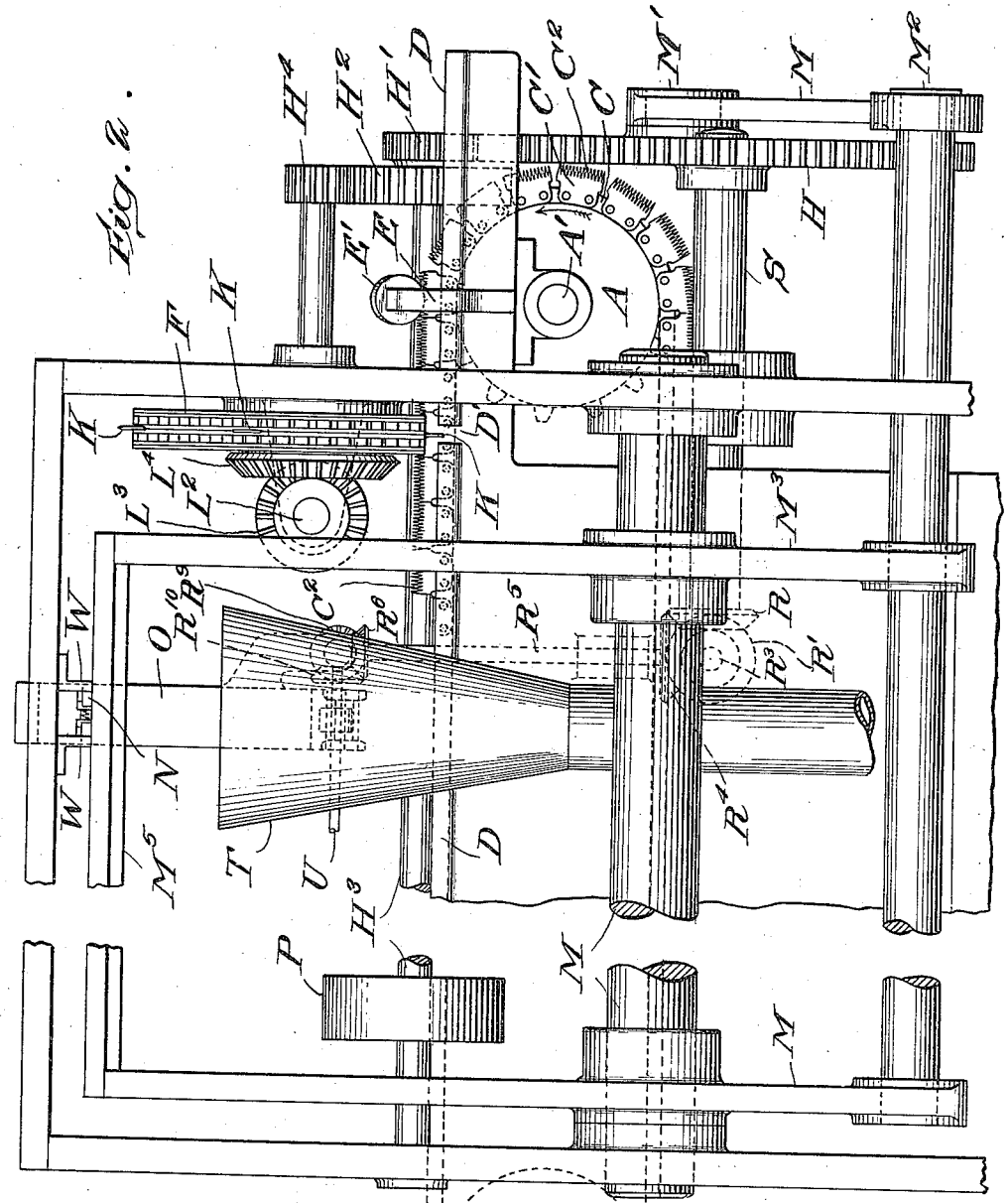

G. A. LOWRY.
SHREDDING MACHINE.
APPLICATION FILED MAY 6, 1912.
1,063,365.
Patented June 3, 1913.
4 SHEETS—SHEET 3.
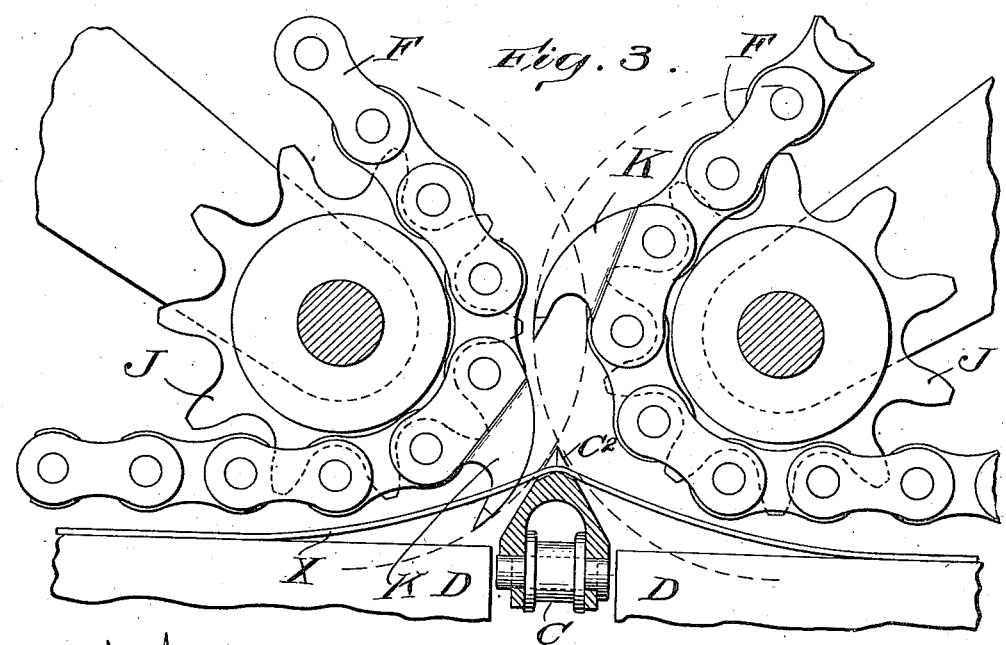
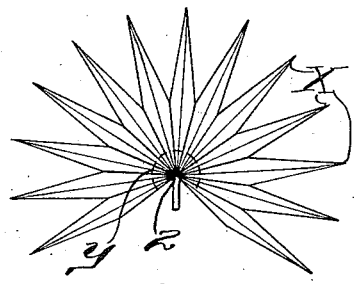
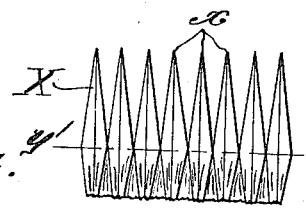
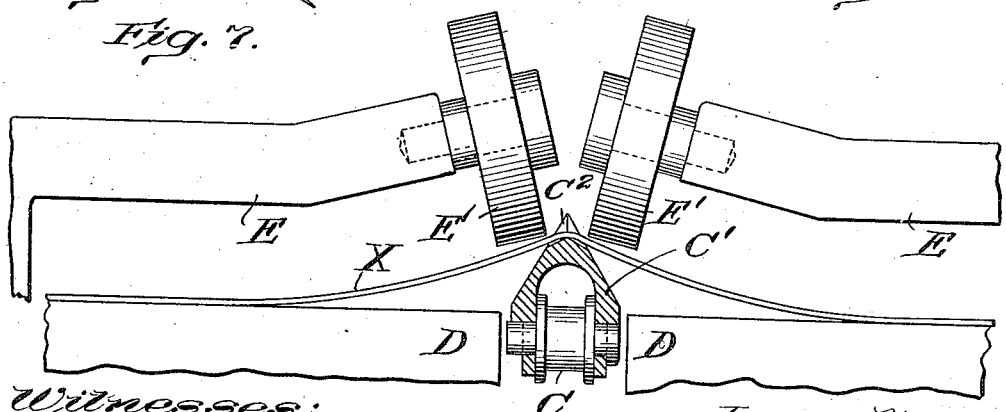

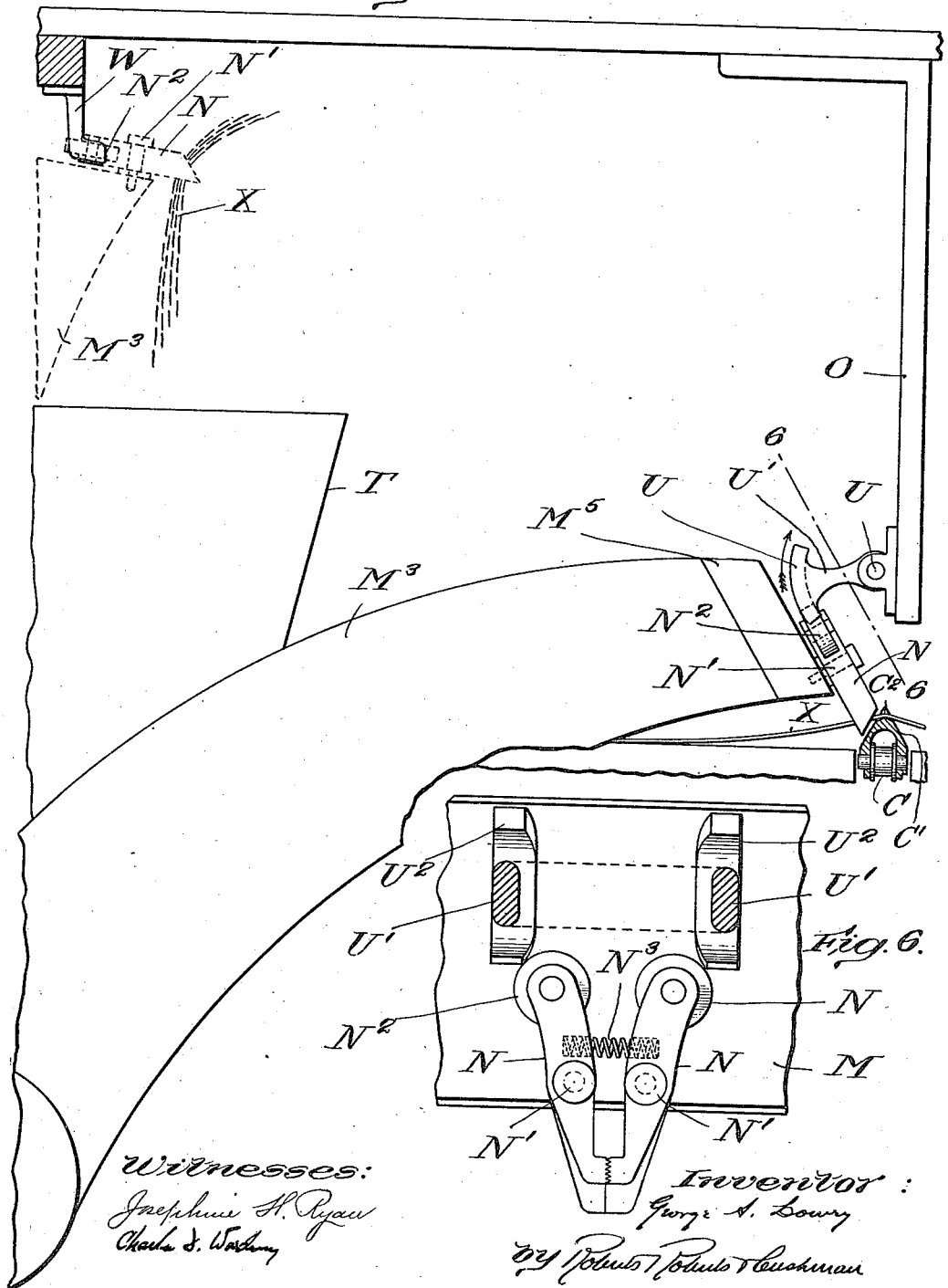

UNITED STATES PATENT OFFICE.

GEORGE A. LOWRY, OF MALDEN, MASSACHUSETTS.

SHREDDING-MACHINE.

1,063,365.  Specification of Letters Patent.  Patented June 3, 1913.

Application filed May 6, 1912. Serial No. 695,480.

*To all whom it may concern:*

Be it known that I, GEORGE A. LOWRY, a citizen of the United States, and resident of Malden, in the county of Middlesex and State of Massachusetts, have invented new and useful Improvements in Shredding-Machines, of which the following is a specification.

My invention relates to the art of reducing thin sheet-like material to shreds and consists of improvements which are particularly addressed to and intended for shredding the leaves of plants such as palmetto or palm so as to produce narrow shreds or ribbons of material which may be devoted to sundry uses, for example: the production of twisted cord or twine.

In the drawings hereto annexed which illustrate an example of my invention,—Figure 1 is a front elevation of a shredding machine, partly broken away to show interior portions; Fig. 2 is a side elevation of the machine; Fig. 3 is a detail on a larger scale showing the relation of the conveyer and shredding knives; Fig. 4 is a detail also on a large scale showing the pressers which force material upon the conveyer; Fig. 5 shows in elevation the picker mechanism; Fig. 6 is a detail on a larger scale of a portion of the picker mechanism; Fig. 7 represents a leaf of palmetto in its natural state; and Fig. 8 is a similar leaf when prepared for introduction into the shredding machine.

Referring first to Figs. 7 and 8, the segments or blades which constitute the leaf X radiate from the stem Z. The vegetable material at or near the stem Z is tough and gummy and is cut away by making a cut through the leaf as on the dotted line $y$. The leaf is then spread out to the shape shown in Fig. 7, the serrations extending inward to the dotted line $y'$. A function of the machine now to be described is to reduce the leaf, thus cut and spread, to a number of shreds of substantially equal width at the middle, and tapering to a point at either end. Each leaf has a decided grain extending radially from the center of the leaf to the tips of the serrations and this grain is of material assistance in reducing the leaf to shreds.

Referring to Fig. 1, the sprocket wheel A mounted upon a transverse shaft A' carries the conveyer which consists of a chain (see Fig. 2) which is composed in part of links C' which are furnished at their outer edges or tops with sharp splitting points $C^2$. When the conveyer chain straightens out between the sprocket wheels A, $A^3$ (see Fig. 2) the links C' abut end to end so that a substantially continuous row of closely spaced splitting points is presented to the material which is introduced from the table D which projects at the front of the machine. The material, such as cut and spread palmetto leaves, is introduced into the machine by laying each leaf upon the splitting pins $C^2$ in such manner that the presser rolls E' mounted on the arms E will press the leaf down upon the splitting pins which penetrate the leaf along the line marked $y'$ in Fig. 8. The attendant feeds the machine by inserting the leaves one after the other so that they form practically a continuous band of material. If the material be such palmetto leaves as above described care should be taken to introduce the leaves so that the serrated sides of the leaves will always be at one side of the conveyer. The shredding knives K K are mounted to move rotatively, upon the sprocket chains F; these chains are carried over the wheels G, J and G' and are driven from the main shaft $R^2$ of the machine through gears $H^2$ $H^4$, bevel gears L, L', shaft $L^2$ and bevel gears $L^3$ and $L^4$. The conveyer is driven by the worm wheel $A^2$ which meshes with a worm $A^4$ on the shaft $E^3$, (shown in dotted lines in Fig. 1). The coöperation of the conveyer with its splitting pins and the shredding knives is best illustrated in Fig. 3. The material X is penetrated by the splitting pins $C^2$ which make a large number of short slits in a row along the middle line of the material, the conveyer chain C and the shredding knives K are so timed that the points of the shredding knives descend on either side passing close to the edge of the splitting pins, enter the slits made by the splitting pins, descend through the transverse slot D' in the table D (see Fig. 2) and then move outwardly, slitting the material in both directions. As the conveyer is fed forward slowly the successive blades K descend and enter the successive slits made in the material by the splitting points, so that as many shreds are produced as there are slits in the material made by the splitting points $C^2$. There are two similar sets of splitting knives, which work outward in both directions from the conveyer, and the knives are so placed and timed that two of them act on the material simultaneously, so that there is no tendency to draw it sidewise in either direction, as the pull of one knife is balanced by an opposite pull exerted by the other. In Fig. 4 the operation of the presser rolls E' forcing the material X down upon the splitting pins C² is illustrated. After the shredding knives have completed their work as above described the further movement of the conveyer carries the shreds farther into the machine dragging them along the table D. As this shredding machine is designed to operate in conjunction with a twisting machine to twist the shreds into cords means are provided for regularly dispensing supplies of shreds to a twister which forms the shreds into cords. The mode of delivering shreds to a twister is shown herein only conventionally; the twister mechanism may be of any approved known variety and the contrivance for delivering shreds in proper arrangement to a twister constitutes the subject matter of improvements which are not in their specific aspect germane to the shredding machine herein described.

The picker mechanism for delivering shreds to be twisted is illustrated in Figs. 1, 2 and 5. The shaft S carries a gear wheel H driven by the pinion H' on the main shaft H³ which is actuated as by a pulley P (Fig. 2), the wheel H carries a crank pin M' which in turn carries the connecting rod M which actuates the bar M². This bar extending into the machine passes through the ends of oscillating or vibrating arms M³ which form parts of a frame journaled upon the shaft M⁴, the upper member M⁵ of this frame carries the picker nippers N which are shown more clearly in Fig. 5. These nippers N, N are pivotally secured at N', N'; to the cross member M⁵ of the oscillating frame; they are held normally in closed position by a spring N³ held in compression between the nipper arms each of which carries a roll N². As the oscillating frame descends to the full line position shown in Fig. 5 to bring the points of the nippers into close juxtaposition with the splitting pins C² of the conveyer C, the nippers are first opened by the operation of the spreader secured to the shaft U which is journaled on the depending arm O. This shaft is driven by the gear connections shown in Figs. 1 and 2, the train being composed of bevel gears R R' of which the former is keyed to the shaft S; shaft R², bevel gears R³, R⁴, shaft R⁵, bevel gears R⁶, R⁷, shaft R⁸, and bevel gears R⁹, R¹⁰. The parallel arms U terminate in spreading cams U² and the connecting gearing which drives the shaft U is so proportioned and timed that as the nippers N descend to grasp a number of shreds, the cam U² engaging the rolls N² opens the nipper jaws and then releases them so that the spring N³ snaps the jaws together at the time they are in the position shown in Fig. 3 in full line. Then the oscillating frame moves upward to the position shown in dotted lines in Fig. 5 carrying the nipper rolls N² into engagement with the stationary spreader W which opens the nippers and allows the shreds X to fall into the tunnel T beneath. The machine is preferably constructed to include several such sets of nippers secured to the cross member M⁵ of the oscillating frame and so to determine their spacing that all of the material shredded by the machine will be removed from the conveyer in its transit from sprocket wheel A to the rear sprocket A³.

What I claim and desire to secure by Letters Patent is:

1. In a shredding machine, the combination of a conveyer furnished with splitting points adapted to form initial transverse slits in material, and shredding knives with means to enter the knives in said initial slits and move them from the splitting points outward.

2. In a shredding machine, the combination of a conveyer furnished with splitting points adapted to form initial transverse slits in material and shredding knives with means to enter the knives in said initial slits and move them from the splitting points outward at either side of the conveyer.

3. In a shredding machine, the combination of a conveyer furnished with splitting points adapted to form initial transverse slits in material, and shredding knives with means to enter the knives in said initial slits and move them from the splitting points outward at either side of the conveyer simultaneously.

4. In a shredding machine, the combination of a conveyer furnished with splitting points adapted to form initial transverse slits in material, and shredding knives with means to move the knives in succession to enter successive initial slits and thence from the splitting points outward.

5. In a shredding machine, the combination of a conveyer furnished with splitting points adapted to form initial transverse slits in material, and shredding knives with means to move the knives in succession to enter successive initial slits and thence from the splitting points outward at either side of the conveyer.

6. In a shredding machine, the combination of a conveyer furnished with splitting points adapted to form initial transverse slits in material and shredding knives with means to move the knives in succession to enter successively initial slits and thence from the splitting points outward at either side of the conveyer simultaneously.

7. In a shredding machine, the combination of a conveyer furnished with splitting points, and shredding knives, with means to move the knives from the splitting points outward and a picker to remove shreds from the splitting points.

8. In a shredding machine, the combination of a conveyer furnished with splitting points, shredding knives, with means to move the knives in succession close to successive splitting points and thence from the splitting points outward at either side of the conveyer, and a picker to remove shreds from the splitting points.

9. In a shredding machine, the combination of a conveyer furnished with splitting points, shredding knives, with means to move the knives from the splitting points outward, a picker, comprising nippers to engage shreds carried by the conveyer points, means to vibrate the picker to and from the conveyer and means to open and close the nippers to seize and release the shreds.

10. In a shredding machine, the combination of a conveyer furnished with splitting points, shredding knives, with means to move the knives from the splitting points outward, a picker comprising pivoted spring closed nippers to engage shreds carried by the conveyer points, means to vibrate the picker to and from the conveyer, a spreader to open the nippers as they approach the conveyer, and another spreader to open the nippers to release shreds held thereby.

11. In a shredding machine, the combination of a conveyer furnished with splitting points adapted to form initial transverse slits in material, pressers to force material to be shredded upon the splitting points to form said slits therein, and shredding knives with means to enter the knives in said initial slits and move them from the splitting points outward.

12. In a shredding machine, the combination of a conveyer furnished with splitting points adapted to form initial transverse slits in material, pressers to force material to be shredded upon the splitting points to form said slits therein, and shredding knives with means to enter the knives in said initial slits and move them from the splitting points outward at either side of the conveyer.

13. In a shredding machine, the combination of a conveyer furnished with splitting points adapted to form initial transverse slits in material, pressers to force material to be shredded upon the splitting points to form said slits therein, and shredding knives with means to enter the knives in said initial slits and move them from the splitting points outward at either side of the conveyer simultaneously.

14. In a shredding machine, the combination of a conveyer furnished with splitting points, pressers to force material to be shredded upon the splitting points, shredding knives, with means to move the knives from the splitting points outward and a picker to remove shreds from the splitting points.

15. In a shredding machine, the combination of a conveyer furnished with splitting points, pressers to force material to be shredded upon the splitting points, shredding knives, with means to move the knives from the splitting points outward, a picker comprising nippers to engage shreds carried by the conveyer points, means to vibrate the picker to and from the conveyer and means to open and close the nippers to seize and release the shreds.

16. In a shredding machine, the combination of a conveyer furnished with splitting points, pressers to force material to be shredded upon the splitting points, shredding knives, with means to move the knives from the splitting points outward, a picker comprising pivoted spring closed nippers to engage shreds carried by the conveyer points, means to vibrate the picker to and from the conveyer, a spreader to open the nippers as they approach the conveyer, and another spreader to open the nippers to release shreds held thereby.

Signed by me at Boston, Massachusetts, this third day of May, 1912.

GEORGE A. LOWRY.

Witnesses:
CHARLES D. WOODBERRY,
ODIN ROBERTS.

Copies of this patent may be obtained for five cents each, by addressing the "Commissioner of Patents, Washington, D. C."